United States Patent
Dormidontov et al.

(10) Patent No.: US 11,734,376 B2
(45) Date of Patent: Aug. 22, 2023

(54) METHOD AND SERVER FOR RANKING DIGITAL DOCUMENTS IN RESPONSE TO A QUERY

(71) Applicant: YANDEX EUROPE AG, Lucerne (CH)

(72) Inventors: Sergey Igorevich Dormidontov, Moscow (RU); Ivan Anatolevich Tyamgin, Simferopol (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 17/399,579

(22) Filed: Aug. 11, 2021

(65) Prior Publication Data
US 2022/0207094 A1    Jun. 30, 2022

(30) Foreign Application Priority Data
Dec. 30, 2020   (RU) .................................. 2020143966

(51) Int. Cl.
*G06F 16/957* (2019.01)
*G06N 20/00* (2019.01)
*G06F 16/951* (2019.01)

(52) U.S. Cl.
CPC .......... *G06F 16/957* (2019.01); *G06F 16/951* (2019.01); *G06N 20/00* (2019.01)

(58) Field of Classification Search
CPC ...... G06F 16/957; G06F 16/951; G06N 20/00
See application file for complete search history.

(56) References Cited

U.S. PATENT DOCUMENTS

| 9,436,742 | B1* | 9/2016 | Hammad | G06F 16/9535 |
| 2003/0172048 | A1* | 9/2003 | Kauffman | G06F 16/951 |
| 2008/0301281 | A1 | 12/2008 | Wang et al. | |
| 2009/0198673 | A1 | 8/2009 | Gao et al. | |
| 2013/0340098 | A1* | 12/2013 | Rane | H04L 63/0407 726/29 |
| 2018/0246974 | A1* | 8/2018 | Shukla | G06F 16/9535 |
| 2019/0164084 | A1 | 5/2019 | Gulin et al. | |
| 2020/0201915 | A1* | 6/2020 | Pathak | G06N 3/084 |

OTHER PUBLICATIONS https://catboost.ai accessed on Jul. 26, 2021, pdf 5 pages.

* cited by examiner

*Primary Examiner* — Kuen S Lu
(74) *Attorney, Agent, or Firm* — BCF LLP

(57) ABSTRACT

A method of and server for ranking documents in response to a query are provided. The method includes determining a target resource hosting a document, and generating a first and a second randomly-selected value for the document. During a first time interval, the method includes acquiring a query and generating a first ranked list of documents to the query based on the first randomly-selected value. The first ranked list includes the document at a promoted-rank position. During the second time interval, the method includes acquiring a query and generating a second ranked list of documents to the query based on the second randomly-selected value. The second ranked list includes the document at a demoted-rank position. The promoted-rank position in the first ranked list is above the demoted-rank position in the second ranked list for increasing a gap in user traffic to the document between the first and second time intervals.

30 Claims, 7 Drawing Sheets

METHOD AND SERVER FOR RANKING DIGITAL DOCUMENTS IN RESPONSE TO A QUERY

FIELD

The present application claims priority to Russian Patent Application No. 2020143966, entitled "METHOD AND SERVER FOR RANKING DIGITAL DOCUMENTS IN RESPONSE TO A QUERY," filed on Dec. 30, 2020, the entirety of which is incorporated herein by reference.

FIELD

The present technology relates to search engine technologies. In particular, the present technology is directed to methods and servers for ranking digital documents in response to a query.

BACKGROUND

The Internet provides access to a wide variety of resources, for example, video files, image files, audio files, or Web pages. Search engines are used to search these resources. For example, digital images that satisfy a user's informational need can be identified by a search engine in response to receiving a user query submitted by a user. User queries can be composed of one or more query terms. The search system selects and ranks search results based on their relevance to the user query and on their importance or quality relative to other search results and also provides top search results to the user.

Search engine systems comprise a component called an inverted index that includes a large number of posting lists associated with respective search terms and stores indications of documents that contain the respective search terms. Such data structures allow reducing the time, memory, and processing resources to perform searches.

Some searches submitted to the search engine are destined for commercial purposes. For example, a user may be looking to purchase a product or service by submitting a search query indicative of that intent and receive in response one or more search results representative of entities providing such products or services. Some of these product and/or service providers may be fraudulent.

United States Patent Publication No. 2009/0198673 entitled "Forum mining for suspicious link spam sites detection" and published on Aug. 6, 2009 discloses anti-spam techniques for protecting search engine ranking and based on mining search engine optimization (SEO) forums. The anti-spam technique collects webpages such as SEO forum posts from a list of suspect spam websites, and extracts suspicious link exchange URLs and corresponding link formation from the collected webpages. A search engine ranking penalty is then applied to the suspicious link exchange URLs. The penalty is at least partially determined by the link information associated with the respective suspicious link exchange URL. To detect more suspicious link exchange URLs, the technique may propagate one or more levels from a seed set of suspicious link exchange URLs generated by mining SEO forums.

SUMMARY

Embodiments of the present technology have been developed based on developers' appreciation of at least one technical problem associated with the prior art approaches to object classification.

In at least one broad aspect of the present technology, there is provided a server executing a plurality of computer-implemented algorithms herein referred to as a "search engine" that is broadly configured to provide search results in response to a query submitted by a user of an electronic device.

Broadly speaking, a web search engine is a software system that is designed to carry out web searches. Search results are generally presented in a ranked format—that is, search results are presented in a list ranked based on relevance to the query. The information is typically displayed to a user via a Search Engine Results Page (SERP). The search results can be digital documents, such as, but not limited to, web pages, images, videos, infographics, articles, research papers, and other types of digital files.

It should be noted that some users may be submitting queries to the search engine for commercial purposes. For example, a user may be desirous of purchasing a product or a service. The user may this submit a search query indicative of the product or service that the user wants to purchase and, in response, the search engine may provide a list of search results comprising most relevant web resources for that query. In some cases, the search engine may retrieve a web resource that fraudulently advertises that product or service.

Typically, fraud detection methods employed by search engine service providers are based on analysis of user interactions between users and web resources. For example, analysis of inter alia click-through rates may be relevant for identifying which web resources are fraudulent and which are not. However, such fraud detection methods detect fraudulent resources after the fact—that is, after one or more users have navigated to the fraudulent resource and after fraud has occurred.

In at least some embodiments of the present technology, developers of the present technology have devised methods and systems for reducing the risk of fraud by deterring operators of the fraudulent resources to continue their fraudulent schemes. It should be noted that operators of fraudulent resources pay close attention to user traffic as it is one of the main factors driving fraud.

Developers of the present technology have devised methods and systems for artificially increasing a gap or variation in user traffic to a given commercial web resource between different time intervals. As a result, the operator of the given commercial web resource may realize that, between a first time interval and a second time interval, user traffic to the given commercial web resource considerably dropped. If the operator is involved in a fraudulent scheme, the operator may consider stopping their fraudulent activity since the now reduced user traffic may not generate enough benefits for continuing the fraudulent scheme.

As it will become apparent from the description herein further below, developers of the present technology have devised methods and systems for increasing a gap or variation in user traffic to a given resource by sequentially-alternatively promoting and demoting the given resource in ranked search results during respective time intervals. The gap in user traffic is thus artificially increased between subsequent time intervals and the operator of the resource may realize that the fraudulent scheme is no longer effective.

In a first broad aspect of the present technology, there is provided a method of ranking documents in response to a query. The query is submitted by a user of an electronic device to a search engine. The search engine is hosted by a server. The method is executable by the server. The method comprises determining, by the server, a target resource amongst a plurality of resources. The plurality of resources hosts digital documents potentially providable by the search engine as search results. The target resource hosts a target document. The method comprises generating, by the server, a first randomly-selected value for the target document to be used for ranking the target document during a first time interval. The method comprises during the first time interval acquiring, by the server, an indication of the query from the electronic device. The method comprises during the first time interval generating, by the server, a first ranked list of relevant documents to the query based on at least in part the first randomly-selected value. The first ranked list of relevant documents comprises the target document at a promoted-rank position. The first randomly-selected value is for promoting the target document in the ranked list of relevant documents. The method comprises generating, by the server, a second randomly-selected value for the target document to be used for ranking the target document during a second time interval. The method comprises during the second time interval acquiring, by the server, an indication of the query from the electronic device. The method comprises during the second time interval generating, by the server, a second ranked list of relevant documents to the query based on at least in part the second randomly-selected value. The second ranked list of relevant documents comprises the target document at a demoted-rank position. The second randomly-selected value is for demoting the target document in the second ranked list of relevant documents. The promoted-rank position in the first ranked list is above the demoted-rank position in the second ranked list for increasing a gap in user traffic to the target document between the first time interval and the second time interval.

In some embodiments of the method, the generating the first randomly-selected value and the second randomly-selected value comprises employing, by the server, a randomization algorithm.

In some embodiments of the method, the randomization algorithm generates (i) a positive value when employed for the generating the first randomly-selected value, and (ii) a negative value when employed for the generating the second randomly-selected value.

In some embodiments of the method, the method further comprises, during the first time interval, executing, by the server hosting the search engine, a first plurality of searches, and during the second time interval, executing, by the server hosting the search engine, a second plurality of searches. The target document is provided as a search result for a subset of the first plurality of searches and for a subset of the second plurality of searches.

In some embodiments of the method, the method further comprises monitoring, by the server, the user traffic to the target document during the first time interval and during the second time interval.

In some embodiments of the method, the generating the first ranked list and the second ranked list is performed by a Machine Learning Algorithm (MLA) having been trained to rank documents based on (i) respective estimated relevance to the query and (ii) respective randomly-selected values.

In some embodiments of the method, the method further comprises training, by the server, the MLA to rank documents. The training comprises acquiring, by the server, training data for a training document-query pair, the training data comprising (i) query data associated with a training query, (ii) document data associated with a training document including a training randomly-selected value and (iii) an assessed label indicative of a relevance of the training document to the training query. The training comprises generating, by the server, a modified label as a combination of the assessed label and the training randomly-selected value, thereby generating a training set comprising the query data, the document data and the modified label. The training comprises during a given training iteration inputting, by the server into the MLA, the query data and the document data for generating a predicted ranking score for the training document. The predicted ranking score is indicative of a predicted relevance of the training document to the training query. The training comprises during a given training iteration adjusting, by the server, the MLA based on a comparison of the predicted ranking score against the modified label so as to train the MLA to generate predicted ranking scores that are similar to the modified label.

In some embodiments of the method, the determining the target resource comprises accessing, by the server, a database system for retrieving past search data, the past search data comprising data indicative of past queries and respectively associated documents that have been provided as search results in response thereto. The determining the target resource comprises determining, by the server, a plurality of commercial resources by determining which resources host digital documents that have been provided as search results to past commercial queries. A given past commercial query is a given past query having at least one pre-determined term. The determining the target resource comprises filtering, by the server, the plurality of commercial resources by removing high-traffic resources, thereby determining a set of commercial resources. The filtering comprises applying, by the server, a traffic-based threshold onto user traffic associated with the respective ones of the plurality of commercial resources. The determining the target resource comprises filtering, by the server, the set of commercial resources by removing high-quality resources, thereby determining a subset of commercial resources. The filtering comprises applying, by the server, a quality-based threshold onto data associated with the respective ones from the set of commercial resources. The subset of commercial resources comprises the target resource.

In some embodiments of the method, the method further comprises selecting, by the server, the target resource amongst a subset of commercial resources, the target resource being a given commercial resource.

In some embodiments of the method, the method further comprises determining, by the server, a plurality of commercial resources based on search data of the search engine, and determining, by the server, the subset of commercial resources by filtering out a group of commercial resources from the plurality of commercial resources. The group of resources has a high likelihood of not including fraudulent resources based on one or more pre-determined parameter.

In some embodiments of the method, the method further comprises determining, by the server, the group of commercial resources by applying a pre-determined parameter onto the search data associated with the respective ones from the plurality of commercial resources. The pre-determined parameter is at least one of a traffic-based threshold and a quality-based threshold. High-traffic resources and high-quality resources amongst the plurality of commercial resources have a high likelihood of not being fraudulent resources.

In some embodiments of the method, the first time interval and the second time interval have a common time length.

In some embodiments of the method, the first time interval is before the second time interval.

In some embodiments of the method, the first time interval is after the second time interval.

In some embodiments of the method, the first time interval is one of a plurality of first time intervals and the second time interval is one of a plurality of second time intervals, the respective ones from the plurality of first time intervals and from the second plurality of time intervals are sequentially staggered in time.

In a second broad aspect of the present technology, there is provided a server for ranking documents in response to a query. The query is submitted by a user of an electronic device to a search engine. The search engine is hosted by the server. The server is configured to determine a target resource amongst a plurality of resources. The plurality of resources hosts digital documents potentially providable by the search engine as search results. The target resource hosts a target document. The server is configured to generate a first randomly-selected value for the target document to be used for ranking the target document during a first time interval. The server is configured to during the first time interval acquire an indication of the query from the electronic device. The server is configured to during the first time interval generate a first ranked list of relevant documents to the query based on at least in part the first randomly-selected value. The first ranked list of relevant documents comprises the target document at a promoted-rank position. The first randomly-selected value is for promoting the target document in the ranked list of relevant documents. The server is configured to generate a second randomly-selected value for the target document to be used for ranking the target document during a second time interval. The server is configured to during the second time interval acquire an indication of the query from the electronic device. The server is configured to during the second time interval generate a second ranked list of relevant documents to the query based on at least in part the second randomly-selected value. The second ranked list of relevant documents comprises the target document at a demoted-rank position. The second randomly-selected value is for demoting the target document in the second ranked list of relevant documents. The promoted-rank position in the first ranked list is above the demoted-rank position in the second ranked list for increasing a gap in user traffic to the target document between the first time interval and the second time interval.

In some embodiments of the server, the server configured to generate the first randomly-selected value and the second randomly-selected value comprises the server configured to employ a randomization algorithm.

In some embodiments of the server, the randomization algorithm generates (i) a positive value when employed for the generating the first randomly-selected value, and (ii) a negative value when employed for the generating the second randomly-selected value.

In some embodiments of the server, the server is further configured to, during the first time interval, execute, by the search engine, a first plurality of searches, and during the second time interval, execute, by the search engine, a second plurality of searches. The target document is provided as a search result for a subset of the first plurality of searches and for a subset of the second plurality of searches.

In some embodiments of the server, the server is further configured to monitor the user traffic to the target document during the first time interval and during the second time interval.

In some embodiments of the server, the server configured to generate the first ranked list and the second ranked list employs a Machine Learning Algorithm (MLA) having been trained to rank documents based on (i) respective estimated relevance to the query and (ii) respective randomly-selected values.

In some embodiments of the server, the server is further configured to train the MLA to rank documents. The server configured to train the MLA comprises the server configured to acquire training data for a training document-query pair, the training data comprising (i) query data associated with a training query, (ii) document data associated with a training document including a training randomly-selected value and (iii) an assessed label indicative of a relevance of the training document to the training query. The server configured to train the MLA comprises the server configured to generate a modified label as a combination of the assessed label and the training randomly-selected value, thereby generating a training set comprising the query data, the document data and the modified label. The server configured to train the MLA comprises the server configured to during a given training iteration input, into the MLA, the query data and the document data for generating a predicted ranking score for the training document. The predicted ranking score is indicative of a predicted relevance of the training document to the training query. The server configured to train the MLA comprises the server configured to during a given training iteration, adjust the MLA based on a comparison of the predicted ranking score against the modified label so as to train the MLA to generate predicted ranking scores that are similar to the modified label.

In some embodiments of the server, the server configured to determine the target resource comprises the server configured to access a database system for retrieving past search data, the past search data comprising data indicative of past queries and respectively associated documents that have been provided as search results in response thereto, determine a plurality of commercial resources by determining which resources host digital documents that have been provided as search results to past commercial queries, where a given past commercial query is a given past query having at least one pre-determined term. The server configured to determine the target resource comprises the server configured to filter the plurality of commercial resources by removing high-traffic resources, thereby determining a set of commercial resources. The server configured to filter comprises the server configured to apply a traffic-based threshold onto user traffic associated with the respective ones of the plurality of commercial resources. The server configured to determine the target resource comprises the server configured to filter the set of commercial resources by removing high-quality resources, thereby determining a subset of commercial resources. The server configured to filter comprises the server configured to apply a quality-based threshold onto data associated with the respective ones from the set of commercial resources. The subset of commercial resources comprising the target resource.

In some embodiments of the server, the server is further configured to select the target resource amongst a subset of commercial resources, the target resource being a given commercial resource.

In some embodiments of the server, the server is further configured to determine a plurality of commercial resources based on search data of the search engine, determine the subset of commercial resources by filtering out a group of commercial resources from the plurality of commercial resources, where the group of resources has a high likelihood of not including fraudulent resources based on one or more pre-determined parameter.

In some embodiments of the server, the server is further configured to determine the group of commercial resources by applying a pre-determined parameter onto the search data associated with the respective ones from the plurality of commercial resources, where the pre-determined parameter is at least one of a traffic-based threshold and a quality-based threshold. High-traffic resources and high-quality resources amongst the plurality of commercial resources have a high likelihood of not being fraudulent resources.

In some embodiments of the server, the first time interval and the second time interval have a common time length.

In some embodiments of the server, the first time interval is before the second time interval.

In some embodiments of the server, the first time interval is after the second time interval.

In some embodiments of the server, the first time interval is one of a plurality of first time intervals and the second time interval is one of a plurality of second time intervals, the respective ones from the plurality of first time intervals and from the second plurality of time intervals are sequentially staggered in time.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
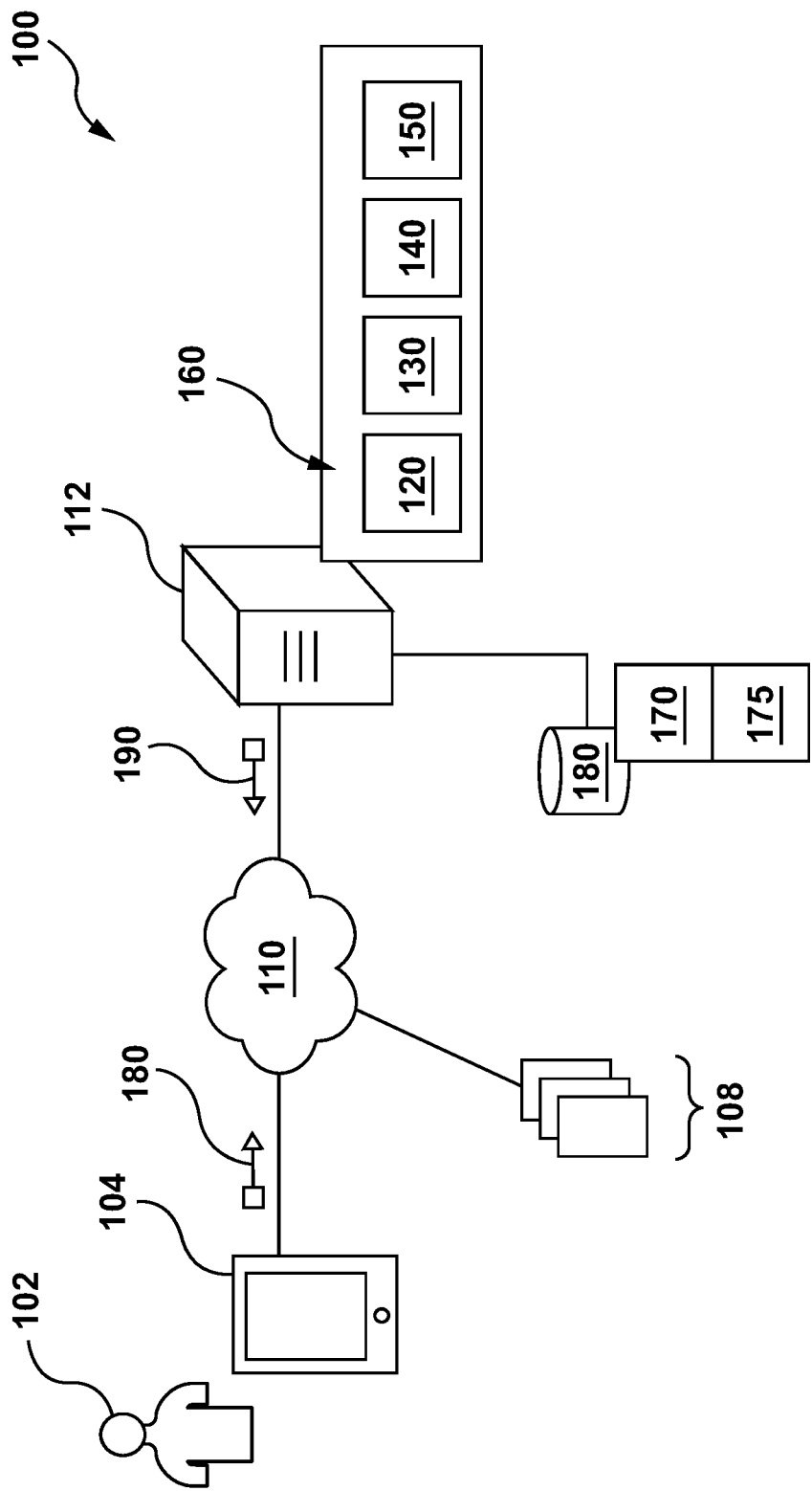
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology.

In the illustrated example, the system 100 may be employed for providing one or more online services to a given user. To that end, the system 100 comprises inter alia an electronic device 104 associated with the user 101, a server 112, a plurality of resource servers 108, and a database sub-system 150.

In the context of the present technology, the system 100 is employed to provide search engine services. For example, the user 101 may submit a given query via the electronic device 104 to the server 112 which, in response, is configured to provide search results to the user 101. The server 112 generates these search results based on information that has been retrieved from, for example, the plurality of resource servers 108 and stored in the database sub-system 150. These search results provided by the system 100 may be relevant to the submitted query.

It can be said that the server 112 is configured to execute a plurality of computer-implemented algorithms that are hereinafter referred to as "a search engine" 160. As it will become apparent from the description herein further below, the search engine 160 is generally configured to identify potentially relevant digital documents for a query and rank them based on their relevance to the query.

Electronic Device

As mentioned above, the system 100 comprises the electronic device 104 associated with the user 101. As such, the electronic device 104, or simply "device" 102 can sometimes be referred to as a "client device", "end user device" or "client electronic device". It should be noted that the fact that the electronic device 104 is associated with the user 101 does not need to suggest or imply any mode of operation—such as a need to log in, a need to be registered, or the like.

In the context of the present specification, unless provided expressly otherwise, "electronic device" or "device" is any computer hardware that is capable of running a software appropriate to the relevant task at hand. Thus, some non-limiting examples of the device 104 include personal computers (desktops, laptops, netbooks, etc.), smartphones, tablets and the like. The device 104 comprises hardware and/or software and/or firmware (or a combination thereof), as is known in the art, to execute a given browser application (not depicted).

Generally speaking, the purpose of the given browser application is to enable the user 101 to access one or more web resources. How the given browser application is implemented is not particularly limited. One example of the given browser application that is executable by the device 104 may be embodied as a Yandex™ browser. For example, the user 101 may use the given browser application to (i) navigate to a given search engine website, and (ii) submit a query in response to which (s)he is to be provided with relevant search results.

The device 104 is configured to generate a request 180 for communicating with the server 112. The request 180 may take form of one or more data packets comprising information indicative of, in one example, the query submitted by the user 101. The device 104 is also configured to receive a response 190 from the server 112. The response 190 may take form of one or more data packets comprising information indicative of, in one example, search results that are relevant to the submitted query and computer-readable instructions for displaying by the given browser application to the user 101 these search results.

Communication Network

The system 100 comprises a communication network 110. In one non-limiting example, the communication network 110 may be implemented as the Internet. In other non-limiting examples, the communication network 110 may be implemented differently, such as any wide-area communication network, local-area communication network, a private communication network and the like. In fact, how the communication network 110 is implemented is not limiting and will depend on inter alia how other components of the system 100 are implemented.

The purpose of the communication network 110 is to communicatively couple at least some of the components of the system 100 such as the device 104, the plurality of resource servers 108 and the server 112. For example, this means that the plurality of resource servers 108 is accessible via the communication network 110 by the device 104. In another example, this means that the plurality of resource servers 108 is accessible via the communication network 110 by the server 112. In a further example, this means that the server 112 is accessible via the communication network 110 by the device 104.

The communication network 110 may be used in order to transmit data packets amongst the device 104, the plurality of resource servers 108 and the server 112. For example, the communication network 110 may be used to transmit the request 180 from the device 104 to the server 112. In another example, the communication network 110 may be used to transmit the response 190 from the server 112 to the device 104.

Plurality of Resource Servers

As mentioned above, the plurality of resource servers 108 can be accessed via the communication network 110. The plurality of resource servers 108 may be implemented as conventional computer servers. In a non-limiting example of an embodiment of the present technology, a given one of the plurality of resource servers 108 may be implemented as a Dell™ PowerEdge™ Server running the Microsoft™ Windows Server™ operating system. The given one of the plurality of resource servers 108 may also be implemented in any other suitable hardware and/or software and/or firmware or a combination thereof.

The plurality of resource servers 108 are configured to host (web) resources that can be accessed by the device 104 and/or by the server 106. For example, a given resource hosted by the plurality of resource server 108 may be a given website that is accessible by the device 104 and/or the server 106.

Which type of resources the plurality of resource servers 108 is hosting is not limiting. In at least one embodiment of the present technology, the plurality of resource servers 108 may host one or more commercial resources. For example, at least one web resource may be a website corresponding to an e-commerce platform, such as Ebay™ and Amazon™ e-market platforms. It should be noted that a given resource hosted by the plurality of resource servers 108 may comprise a plurality of digital documents, or simply "documents", representative of respective web pages of a given web site.

Generally speaking, a given document may be written in a mark-up language and may comprise inter alia (i) content of a respective web page and (ii) computer-readable instructions for displaying the respective web page (content thereof). It can be said that a given resource, such as the Amazon™ e-market website, comprises a plurality of documents representative of web pages. For example, these respective web pages may be associated with respective items that are commercially available at the Amazon™ e-market website for sale.

A given one of the plurality of resource servers 108 may be accessed by the device 104 in order to retrieve a given document stored on the given one of the plurality of resource servers 108. For example, the user 101 may enter a web address associated with a given web page in the given browser application of the device 104 and, in response, the device 104 may access a given resource server hosting the given web page in order to retrieve the document representative of the given web page for rendering the content of the web page via the given browser application.

A given one of the plurality of resource servers 108 may be accessed by the server 112 in order to retrieve a given document stored on the given one of the plurality of resource servers 108. The purpose for the server 112 accessing and retrieving documents from the plurality of resource servers 108 will be described in greater detail herein further below.

Database Sub-System

The server 112 is communicatively coupled to the database sub-system 150. Generally speaking, the database sub-system 150 is configured to acquire data from the server 112, store the data, and/or provide the data to the server 106 for further use.

In some embodiments, the database sub-system 150 may be configured to store information associated with the server 112 herein referred to as "search engine data" 175. For example, the database sub-system 150 may store information about previously performed searches by the search engine 160, information about previously submitted queries to the server 112, and about documents that have been provided by the search engine 160 of the server 112 as search results.

As part of the search engine data 175, it is contemplated that the database sub-system 150 may store query data associated with respective queries submitted to the search engine 160. Query data associated with a given query may be of different types and is not limiting. For example, the database sub-system 150 may store query data for respective queries such as, but not limited to:
    popularity of a given query;
    frequency of submission of the given query;
    number of clicks associated with the given query;
    indications of other submitted queries associated with the given query;
    indications of documents associated with the given query;
    other statistical data associated with the given query;
    search terms associated with the given query;
    number of characters within the given query; and
    other query-intrinsic characteristics of the given query.

As part of the search engine data 175, it is contemplated that the database sub-system 150 may also store document data associated with respective documents. Document data associated with a given document may be of different types and is not limiting. For example, the database sub-system 150 may store document data for respective documents such as, but not limited to:
    popularity of a given document;
    click-through-rate for the given document;
    time-per-click associated with the given document;
    indications of queries associated with the given document;
    other statistical data associated with the given document;
    text associated with the given document;

file size of the given document; and
   other document-intrinsic characteristics of the given document.

As it will be discussed in greater detail herein further below, the database sub-system 150 may be configured to store content associated with respective digital documents on a document-by-document basis. For example, the database sub-system 150 may be configured to store content associated with a given digital document.

It should also be noted that the database sub-system 150 may be configured to store user traffic data associated with respective digital documents that are provided as search results to users of the search engine 160. For example, the server 112 may be configured to monitor and collect data representative of user traffic (e.g., number of users visiting a given document, a ratio of visits per time unit, etc.) that the search engine 160 provides to a given document. Furthermore, as it will be discussed below, the database sub-system 150 may be configured to store user traffic data on a document-by-document basis in addition to, or instead of, storing the user traffic data on a resource-by-resource basis. In one example, the server 112 may be configured to monitor and collect data representative of user traffic that the search engine 160 provides to a given resource by means of providing the respective one or more digital documents hosted by the given resource as search results to users of the search engine 160.

As part of the search engine data 175, it is contemplated that the database sub-system 150 may also store user data associated with respective users. User data associated with a given user may be of different types and is not limiting. For example, the database sub-system 150 may store user data for respective users such as, but not limited to:
   past web session data associated with a given user;
   past queries submitted by the given user;
   "click" history data associated with the given user;
   other interaction data between with the given user and documents; and
   user preferences.

As illustrated in FIG. 1, the database sub-system 150 is also configured to store a structured collection of data hereinafter referred to as "an inverted index" 170. Broadly speaking, the inverted index 170 is a data structure that can be said to be a component of the search engine 160. For example, initially, a forward index may be generated, which stores lists of words (or terms) per document—then, the forward index may be inverted such that it stores posting lists of documents per term. Querying the forward index may require sequential iteration through each document and to each term to verify a matching document. The time, memory, and processing resources to perform such a query are not always technically realistic. In contrast, one advantage of the inverted index 170 is that comparatively less time, memory and processing resources are required for querying such data structure in real-time.

In summary, the inverted index 170 is configured to store a plurality of posting lists, each of which is associated with a respective term, and where a given posting list comprises a plurality of documents containing the respective term.
Server The system 100 comprises the server 112 that may be implemented as a conventional computer server. In an example of an embodiment of the present technology, the server 112 may be implemented as a Dell™ PowerEdge™ Server running the Microsoft™ Windows Server™ operating system. Needless to say, the server 106 may be implemented in any other suitable hardware and/or software and/or firmware or a combination thereof. In the depicted non-limiting embodiment of present technology, the server 112 is a single server. In alternative non-limiting embodiments of the present technology, the functionality of the server 106 may be distributed and may be implemented via multiple servers.

As illustrated on FIG. 1, the server 112 is configured to host the search engine 160 for providing search engine services. In some embodiments, the server 112 may be under control and/or management of a search engine provider (not depicted) such as, for example, an operator of the Yandex™ search engine. As such, the server 112 may be configured to host the search engine 160 for performing one or more searches responsive to queries submitted by users of the search engine 160.

For example, the server 112 may receive the request 180 from device 104 indicative of the query submitted by the user 101. The server 112 may perform a search responsive to the submitted query for generating search results that are relevant to the submitted query. As a result, the server 112 may be configured to generate the response 190 indicative of the search results and may transmit the response 190 to the device 104 for display of the search results to the user 101 via the given browser application, for example.

The search results generated for the submitted query may take many forms. However, in one non-limiting example of the present technology, the search results generated by the server 112 may be indicative of documents that are relevant to the submitted query. How the server 112 is configured to determine and retrieve documents that are relevant to the submitted query will become apparent from the description herein.

The server 106 may also configured to execute a crawler application 120. Broadly speaking, the crawler application 120 may be used by the server 112 in order to "visit" resources accessible via the communication network 110 and to retrieve/download them for further use. For example, the crawler application 120 may be used by the server 106 in order to access the plurality of resource servers 108 and to retrieve/download documents representative of web pages hosted by the plurality of resource servers 108.

It is contemplated that the crawler application 120 may be periodically executable by the server 112 in order to retrieve/download documents that have been updated and/or became accessible over the communication network 110 since a previous execution of the crawler application 120.

The server 112 may also be configured to execute "a ranking model" 130 broadly configured to use information about a given query and a plurality of potentially relevant documents for ranking those documents in response to the query. In at least one embodiment of the present technology, the ranking model 130 may be implemented as one or more Machine Learning Algorithms (MLAs). It is contemplated that the plurality of potentially relevant documents may be identified by the server 112 using information stored in the inverted index 170.

Broadly speaking, a given MLA is first "built" (or trained) using training data and training targets. During a given training iteration, the MLA is inputted with a training input, and generates a respective prediction. The server 112 is then configured to, in a sense, "adjust" the MLA based on a comparison of the prediction against a respective training target for the training input. For example, the adjustment may be performed by the server 112 employing one or more machine learning techniques such as, but not limited to, a back-propagation technique. After a large number of training iterations, the MLA is thus "adjusted" in a manner that allows making predictions based on inputted data such that those predictions are close to the respective training targets.

In some embodiments of the present technology, the ranking model 130 may be implemented as a Neural Network (NN). Generally speaking, NNs are a specific class of MLAs that consist of interconnected groups of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than try to determine a complex statistical arrangements or mathematical algorithms for a given situation; the given NN tries to provide an "intuitive" answer based on a "feeling" for a situation. A given NN is thus a kind of a trained "black box", which can be used in a situation when what is in the "box" can be less important; and where having the "box" provide reasonable answers to given inputs being more important. For example, NNs are commonly used to optimize the distribution of web-traffic between servers and in data processing, including filtering, clustering, signal separation, compression, vector generation and the like.

In other embodiments of the present technology, the ranking model 130 may be implemented as a given decision-tree based MLA. Broadly speaking, a given decision-tree based MLA is a machine learning model having one or more "decision trees" that are used (i) to go from observations about an object (represented in the branches) to conclusions about the object's target value (represented in the leaves). In one non-limiting implementation of the present technology, the decision-tree based MLA can be implemented in accordance with the CatBoost framework.

How the decision-tree based MLA can be trained in accordance with at least some embodiments of the present technology is disclosed in a US Patent Publication no. 2019/0164084, entitled "METHOD OF AND SYSTEM FOR GENERATING PREDICTION QUALITY PARAMETER FOR A PREDICATION MODEL EXECUTED IN A MACHINE LEARNING ALGORITHM", published on May 30, 2019, content of which is incorporated by reference herein in its entirety. Additional information regarding the CatBoost library, its implementation, and gradient boosting algorithms is available at catboost.ai.

How the server 112 is configured to train the ranking model 130 for generating ranking scores for ranking potentially relevant documents to a query in at least some embodiments of the present technology will be discussed in greater details herein further below with reference to FIG. 3.

The server 106 is configured to execute one or more computer-implemented algorithms hereinafter referred to as "a randomization algorithm" 140 that is broadly configured to generate random values. It can be said that the server 106 may employ the randomization algorithm 140 in order to generate "randomly-selected" values for different time intervals. For example, the server 106 may use the randomization algorithm 140 in order to generate a given randomly-selected value for a first time interval, and store this given randomly-selected value for the first time interval in the database sub-system 180. In the same example, the server 106 may use the randomization algorithm 140 in order to generate an other given randomly-selected value for a second time interval, and store this other given randomly-selected value for the second time interval in the database sub-system 180.

As it will become apparent from the description herein further below, it should be noted that the server 106 may be configured to use randomly-selected values for promoting, or demoting, target documents in a ranked list of search results. How the server 106 may be configured to use these randomly-selected values during respective time intervals for promoting, or demoting, target documents will be described in greater details herein further below with reference to FIGS. 4 and 5.

The server 112 may also be configured to execute one or more computer-implemented algorithms hereinafter referred to as "filtering algorithm" 150 that is broadly configured to determine one or more commercial resources.

Figure 2:
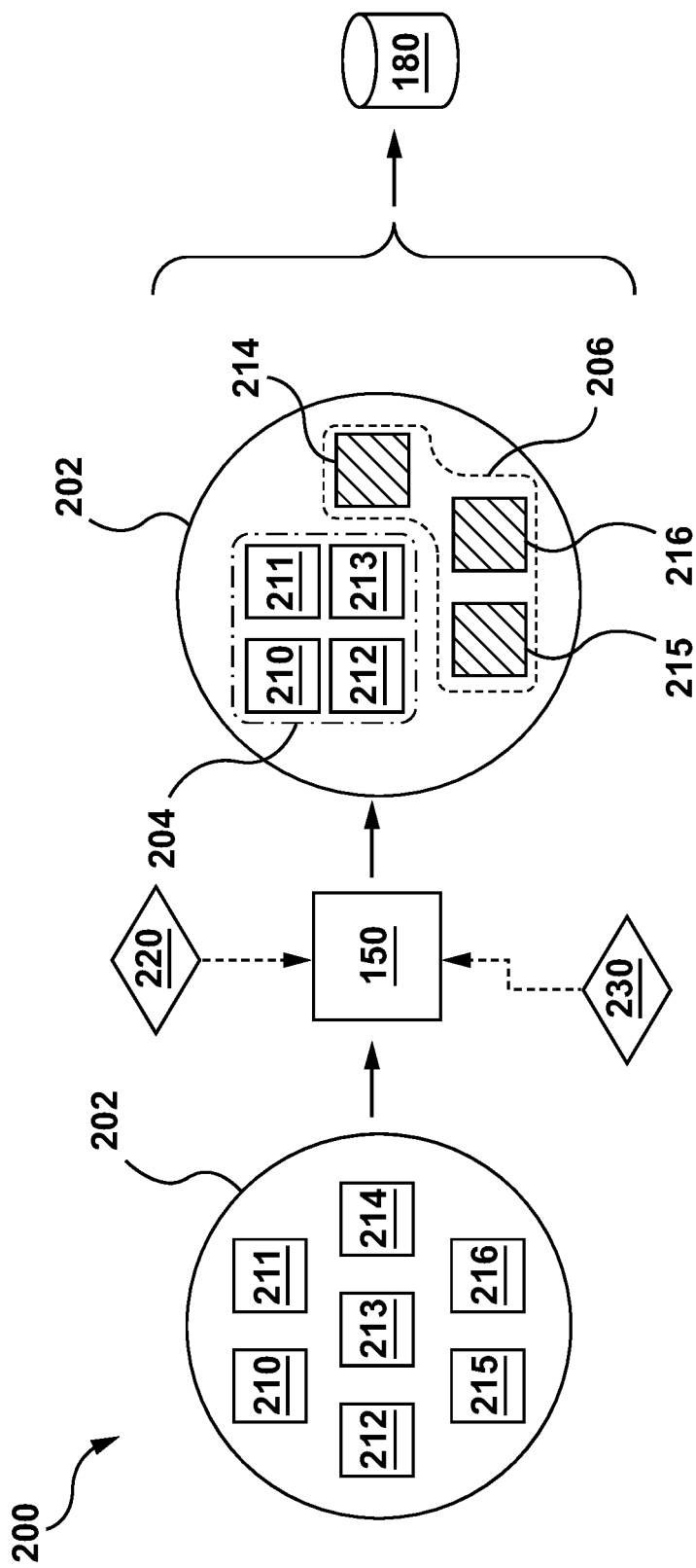
FIG. 2 depicts a representation of how a filtering algorithm is used by the system of FIG. 1 for determining a subset of commercial resources, in accordance with non-limiting embodiments of the present technology.

With reference to FIG. 2, there is depicted a representation 200 of how the server 112 is configured to employ the filtering algorithm 150 for determining a subset of commercial resources 204 that are potentially fraudulent. The server 112 is configured to access the database sub-system 180 for retrieving past search data. For example, past search data may comprise data indicative of past queries submitted to the search engine 160 as well as respectively associated documents that have been previously provided as search results in response thereto.

It is contemplated that the server 112 may be configured to determine a plurality of commercial resources, amongst resources hosting digital documents that are potentially providable as search results to users of the search engine. To that end, the server 112 is configured to use the past search data for determining which resources host digital documents that have been provided as search results to past "commercial queries".

It should be noted that in the context of the present technology, a given commercial query is a given query that has at least one pre-determined, commerce-oriented, term. For example, these commerce-oriented terms may have been determined by an operator of the search engine 160. In one non-limiting example, a list of pre-determined terms may be stored in the database sub-system 180 and may comprise the terms "buy", "sell", "purchase", "price", and the like.

The server 112 may be configured to determine that resources that host documents that have been provided in response to past queries comprising at least one of the pre-determined terms may be commercial resources. For example, as illustrated in FIG. 2, let it be assumed that the server 112 determines a plurality of commercial resources 202 comprising commercial resources 210, 211, 212, 213, 214, 215, and 216.

In some embodiments of the present technology, the server 112 may be configured to use the filtering algorithm 150 in order to determine the subset of commercial resources 204 amongst the plurality of commercial resources 202. Broadly speaking, the filtering algorithm 150 may be configured to employ a pre-determined parameter onto the past search data associated with the respective ones from the plurality of commercial resources 202. In the illustrated non-limiting example, the at least one pre-determined parameter used by the filtering algorithm 150 comprises a traffic-based threshold 220 and a quality-based threshold 230.

For example, the server 112 may be configured to compare a user-traffic metric value associated with respective ones of the plurality of commercial resources 202 against the traffic-based threshold 220 in order to determine which ones are high-traffic resources. Without wishing to be bound to any specific theory, the developers of the present technology have realized that commercial resources that have a relatively high user traffic have a high likelihood of not being fraudulent resources (or otherwise a low likelihood of being fraudulent). The traffic-based threshold 220 may be determined empirically or pre-determined by the operator of the search engine 160 and may depend on inter alia specific implementations of the present technology.

In at least one embodiment, the server 112 may be configured to rank the plurality of commercial resources 202 based on their respective user-traffic metric values. Then, the server 102 may be configured to identify top N-number of commercial resources in the so-ranked list of commercial resources as high-traffic resources. Therefore, it is contemplated that the traffic-based threshold 220 may be indicative of at least one of (i) a given threshold value of a user-traffic metric and (ii) a ranking position in a ranked list of commercial resources having been ranked based on their respective user-traffic metric values.

As mentioned above, the server 112 may also be configured to compare a quality metric value associated with respective ones of the plurality of commercial resources 202 against the quality-based threshold 230 in order to determine which ones are high-quality resources. In some non-limiting examples, a given quality metric may be, but is not limited to, number and/or percentage of users returning to the web resource, number and/or percentage of positive reviews of the web resource, a ratio of direct visits (via bookmarks or browser typing line, for example) to overall visits on the website, long-term retention (how many users are used to visit the website during more than year period, for example), share of ad-clicks on website overall all outbound navigations, share of long session overall all sessions on the website. Without wishing to be bound to any specific theory, the developers of the present technology have realized that commercial resources that have a relatively high quality have a high likelihood of not being fraudulent resources (or otherwise a low likelihood of being fraudulent). The quality-based threshold 220 may be determined empirically or pre-determined by the operator of the search engine 160 and may depend on inter alia the nature of the quality metric and specific implementations of the present technology.

In at least one embodiment, the server 112 may be configured to rank the plurality of commercial resources 202 based on their respective quality metric values. Then, the server 102 may be configured to identify top M-number of commercial resources in the so-ranked list of commercial resources as high-quality resources. Therefore, it is contemplated that the quality-based threshold 220 may be indicative of at least one of (i) a given threshold value of a quality metric and (ii) a ranking position in a ranked list of commercial resources having been ranked based on their respective quality metric values.

Let it be assumed that the server 112 identified the commercial resource 214 as being a given high-traffic resource, and the commercial resources 215 and 216 as high-quality resources. As such, the server 112 may be configured to determine the subset of commercial resources 204 amongst the plurality of commercial resources 202 by removing the high-traffic resource 214 and the high-quality resources 215 and 216. It can be said that in some embodiments of the present technology, the server 112 may be configured to determine a group of commercial resources 206 that includes commercial resources that are likely not fraudulent.

It is contemplated that a set of high-traffic resources and a set of high-quality resources may not be mutually exclusive in each and every embodiment of the present technology. For example, a given high-quality resource may also be a high-traffic resource, and vice versa, in at least some embodiments of the present technology.

In some embodiments of the present technology, it can be said that the server 112 employing the filtering algorithm 150 may be configured to determine the group of commercial resources 206 from the plurality of commercial resources 202 which comprises high-quality and high-traffic resources. It is also contemplated that the server 112 may be configured to store the subset of commercial resources 204 in association with data that is indicative that respective ones from the subset of commercial resources are not high-traffic or high-quality resources.

The server 106 may be configured to use the information indicative of which commercial resources are included in the subset of commercial resources 204 in order to identify one or more target documents to be promoted, or demoted, in ranked lists of search results. As it will be discussed in greater details herein below with reference to FIGS. 4 and 5, the server 106 may be configured to identify documents associated with the commercial resources in the subset of commercial resources 204 as target documents that are to be promoted, or demoted, at different moments in time, when provided as search results in response to a query.

Figure 3:
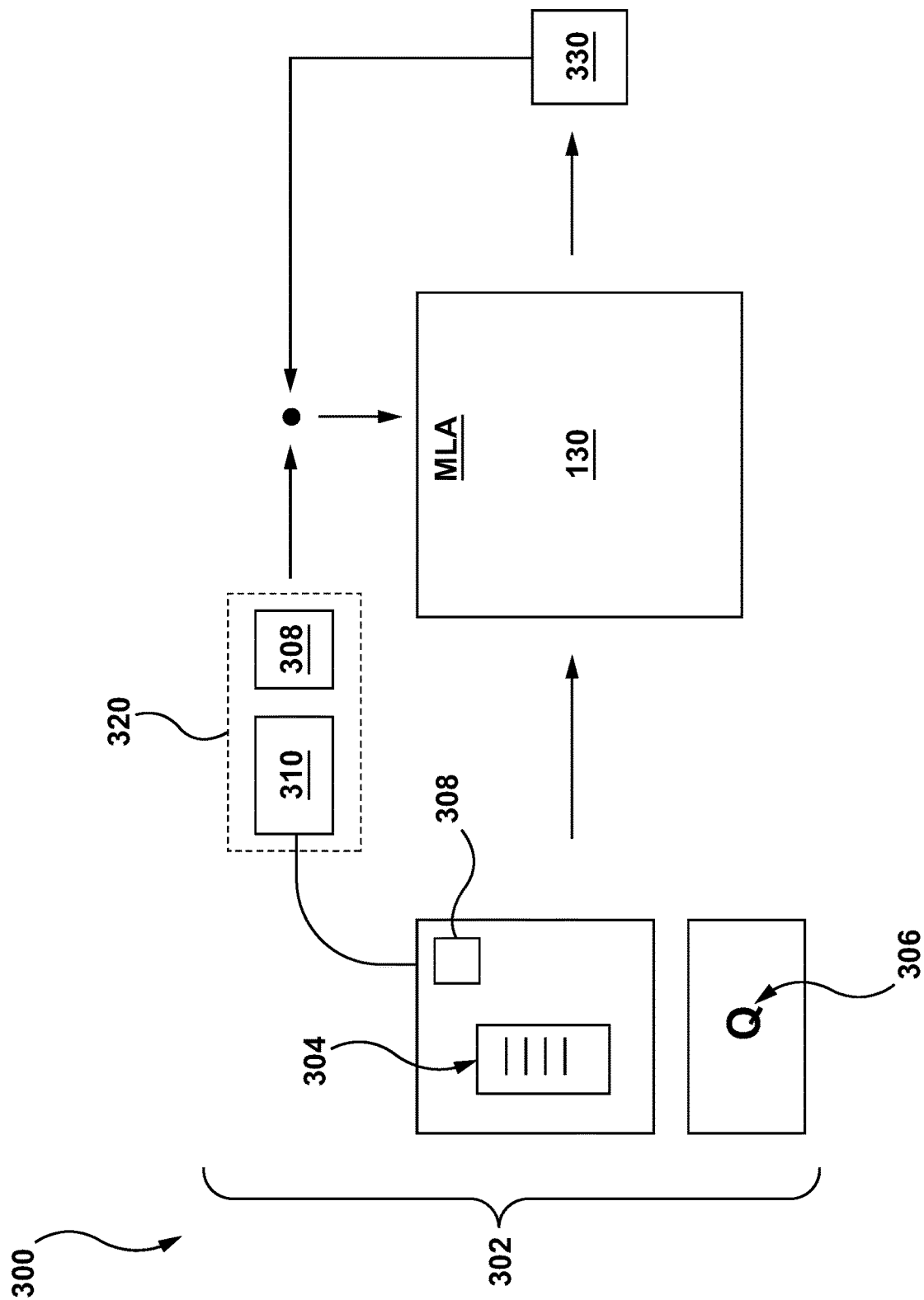
FIG. 3 depicts a representation of a training iteration of a ranking model of the system of FIG. 1, in accordance with non-limiting embodiments of the present technology.

With reference to FIG. 3, there is depicted a representation 300 of a single training iteration of the ranking model 130. The server 112 may be configured to acquire training data 302 for a training document-query pair. The training data 302 comprises (i) query data 306 associated with a training query, (ii) document data 304 associated with a training document including a training randomly-selected value 308, and (iii) an assessed label 310 indicative of a relevance of the training document to the training query.

The server 112 may be configured to generate a modified label 320 as a combination of the assessed label 310 and a training randomly-selected value 308. For example, the server 106 may be configured to use the randomization algorithm 140 in order to generate the randomly-selected value 308 during training of the ranking model 130. Thus, it can be said that the server 112 may be configured to generate a training set comprising the query data 306, the document data 304 and the modified label 320.

It should be noted that during the training iteration, the server 112 is configured to input, into the MLA being trained, the query data 306 and the document data 304 for generating a predicted ranking score 330 for the training document. Broadly speaking, the predicted ranking score 330 is indicative of a predicted relevance of the training document to the training query. The server 112 is also configured to adjust the MLA based on a comparison of the predicted ranking score 330 against the modified label 310 so as to train the MLA to generate predicted ranking scores that are similar to modified labels.

It should be noted that employing the modified label 320 as opposed to the assessed label 310 may allow the server 106 to train the ranking model 130 to take into account randomly-selected values during the in-use phase of the ranking model 130 when ranking documents in response to a query.

Figure 4:
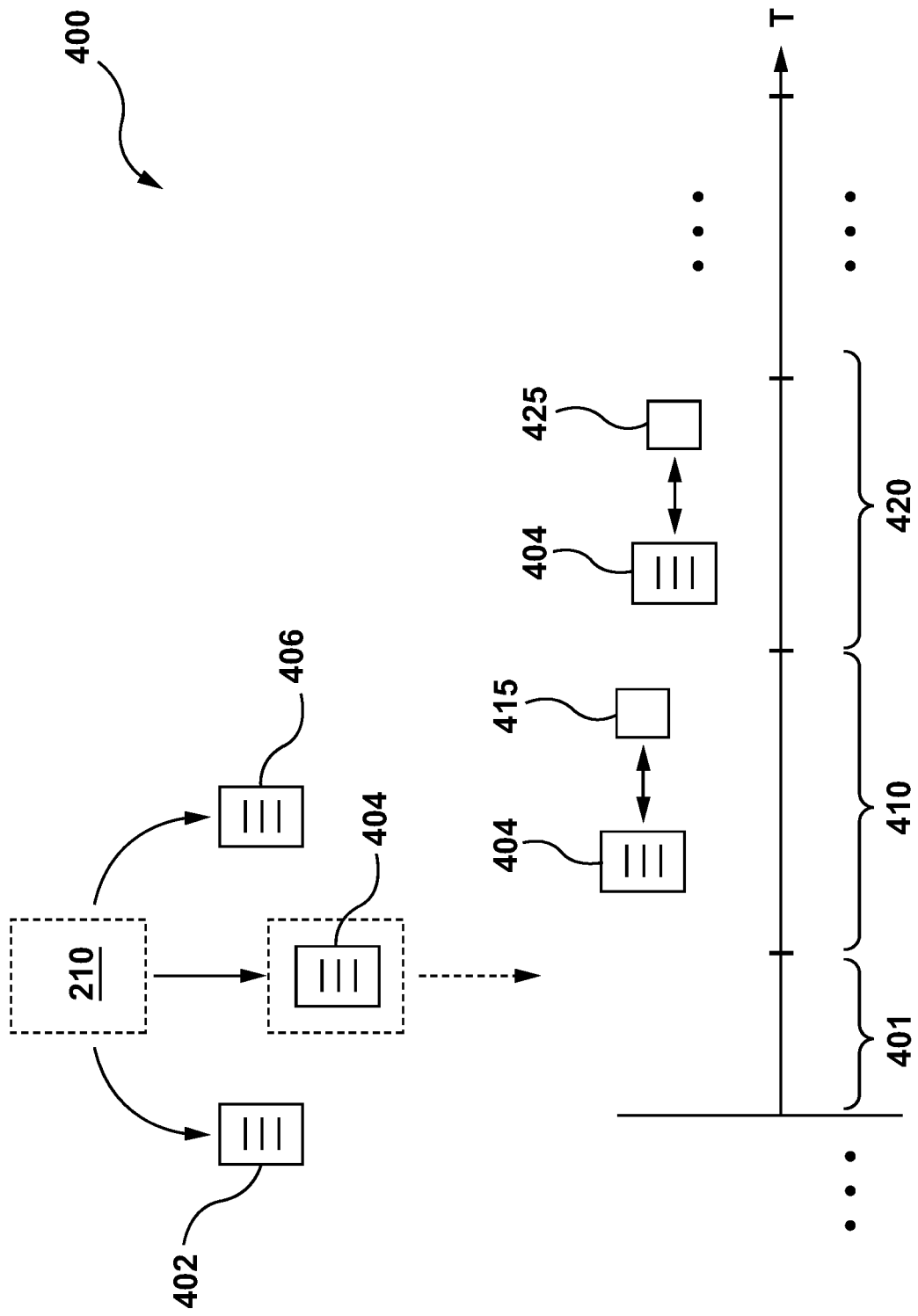
FIG. 4 depicts a representation of how a target document is associated with a first randomly-selected value and a second randomly-selected value at different time intervals, in accordance with non-limiting embodiments of the present technology.

With reference to FIG. 4, there is depicted a representation 400 of how a target document 404 (hosted by the commercial resource 210 from the subset of commercial resources 204) can be stored in association with randomly-selected values at respective time intervals.

The server 106 may be configured to use a randomization algorithm 140 for generating a first randomly-selected value 415 for a first time interval 410 and a second randomly-selected value 425 for a second time interval 420. For example, let it be assumed that the server 106 generates a given positive value as the first randomly-selected value 415, and a given negative value as the second randomly-selected value 425.

In some embodiments, the first time interval 410 and the second time interval 420 may have a common time length— that is, the first time interval 410 and the second time interval 420 can be of the same time length. As illustrated, the first time interval 410 is before the second time interval 420, however, this might not be the case in each and every implementation of the present technology. In one embodiment, the first time interval 410 with the positive randomly-selected value may be after the second time interval 420 with the negative randomly-selected value. Furthermore, it is contemplated that the first time interval 410 may be one of a plurality of first time intervals and the second time interval 420 may be one of a plurality of second time intervals. In such embodiments, the respective ones from the plurality of first time intervals and from the second plurality of time intervals may be sequentially staggered in time. In one embodiment, it is contemplated that the server 106 employing the randomization algorithm may be configured to generate positive randomly-selected values and negative randomly-selected values in a staggered sequence for respective time intervals.

It should be noted that, during the first time interval 410, the server 106 may be configured to execute a first plurality of searches. Let it be assumed that the target document 404 is to be provided as a search result for a given one of the first plurality of searches executed by the server 106 during the first time interval 410. In that case, the server 106 may be configured to verify whether the target document 404 is associated with a given resource from the subset of commercial resources 204. If such is the case, the server 106 may be configured to retrieve from the database sub-system 180 a currently randomly-selected value for ranking purposes of the target document 404. It should be noted that in the illustrated example, the current randomly-selected value during the first time interval is the first randomly-selected value 415.

Also, during the second time interval 420, the server 106 may be configured to execute a second plurality of searches. Let it be assumed that the target document 404 is to be provided as a search result for a given one of the second plurality of searches executed by the server 106 during the second time interval 420. In that case, the server 106 may be configured to verify whether the target document 404 is associated with a given resource from the subset of commercial resources 204. If such is the case, the server 106 may be configured to retrieve from the database sub-system 180 a currently randomly-selected value for ranking purposes of the target document 404. It should be noted that in the illustrated example, the current randomly-selected value during the second time interval is the second randomly-selected value 425.

Figure 5:
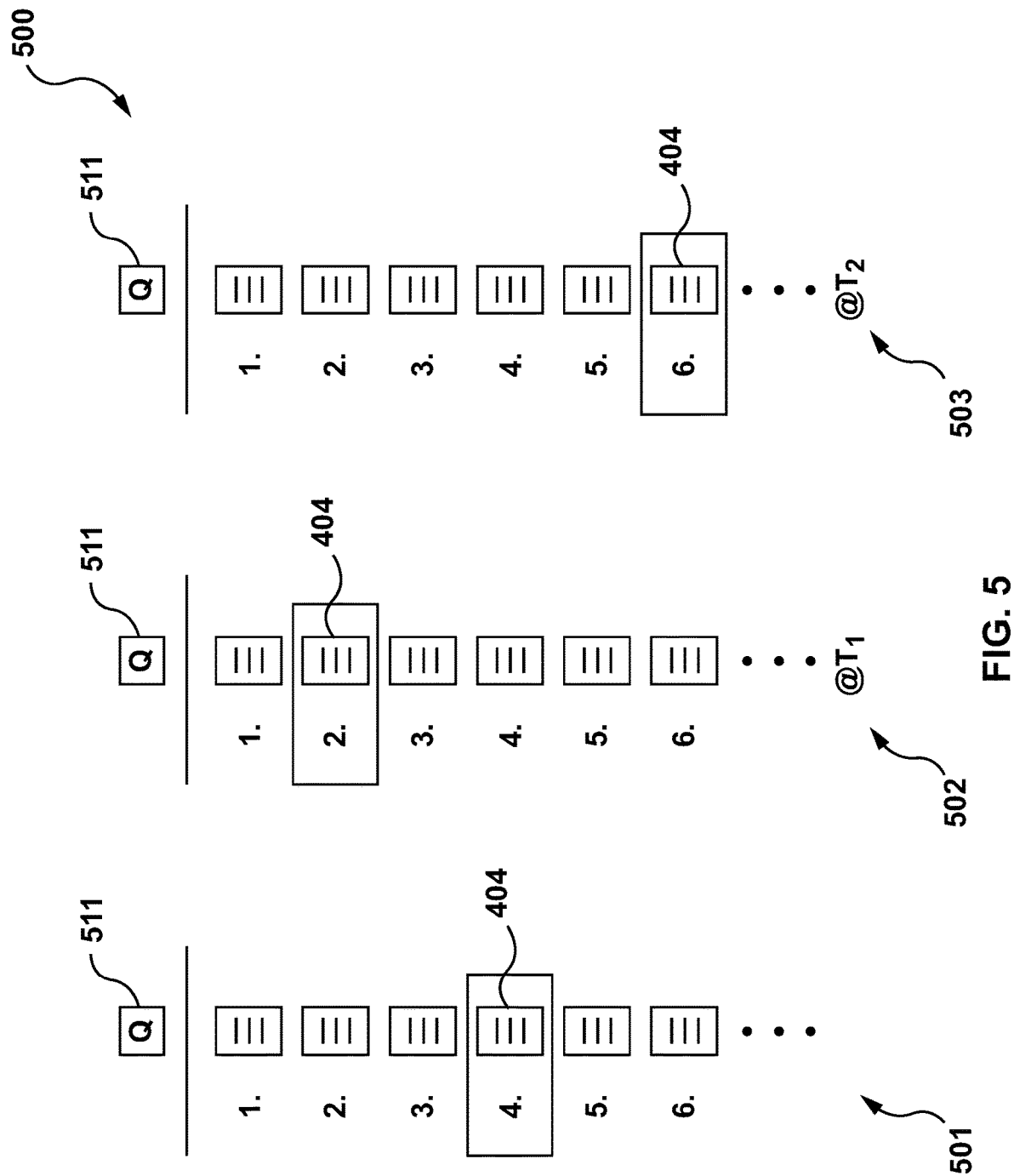
FIG. 5 depicts a representation of ranked lists of documents generated by the system of FIG. 1 in response to a given query at different moments in time, in accordance with non-limiting embodiments of the present technology.

Now with reference to both FIGS. 4 and 5, let it be assumed that the target document 404 is to be provided as a search result in response to a query 511 at different moments in time.

In a first example, let it be assumed that the query 511 is received during an interval of time 401 during which the server 106 is not employing the randomization algorithm 140 for ranking purposes. In such a case, the server 106 may be configured to use the ranking model 130 to generate a ranked list 501 of documents in response to the query 511. Indeed, if the target document 404 is to be ranked during the time interval 401, the server 106 may rank the target document 404 such that it occupies the fourth position in the ranked list 501 in response to the query 511.

In a second example, let it be assumed that the query 511 is received during the first time interval 410 during which the server 106 is employing the randomization algorithm 140 for ranking purposes. In such a case, the server, 106 may be configured to use the first randomly-selected value 415 for ranking the target document 404 by the ranking model 130. When the server 106 inputs data associated with the target document 404 into the ranking model 130, the server 106 is configured to also input the first randomly-selected value 415. Recalling that the first randomly-select value 415 is a positive value, the ranking model 130 may be configured to generate a ranked list 502 when the target document 404 is ranked at a different, higher, position than in the ranked list 501. In the illustrated example, the server 106 may be configured to rank the target document 404 such that it occupies the second position in the ranked list 502 in response to the query 511 during the first time interval 410.

Hence, it can be said that in this second example, the server 106 may be configured to generate a first ranked list of relevant documents (ranked list 502) to the query 511 based on at least in part the first randomly-selected value 415. The first ranked list of relevant documents (the ranked list 502) comprises the target document 404 at a promoted-rank position—that is, the target document 404 occupies the second position in the ranked list 502 as opposed to its default position, the fourth position in the ranked list 501. Hence, it can be said that the first randomly-selected value 415 (in this example being assumed to be positive) promotes the target document 404 in the ranked list of relevant documents.

In a third example, let it be assumed that the query 511 is received during the second time interval 420 during which the server 106 is employing the randomization algorithm 140 for ranking purposes. In such a case, the server, 106 may be configured to use the second randomly-selected value 425 for ranking the target document 404 by the ranking model 130. When the server 106 inputs data associated with the target document 404 into the ranking model 130, the server 106 is configured to also input the second randomly-selected value 425. Recalling that the second randomly-select value 415 is a negative value, the ranking model 130 may be configured to generate a ranked list 503 when the target document 404 is ranked at a different, lower, position than in the ranked list 501. In the illustrated example, the server 106 may be configured to rank the target document 404 such that it occupies the sixth position in the ranked list 503 in response to the query 511 during the second time interval 420.

Hence, it can be said that in this third example, the server 106 may be configured to generate a second ranked list of relevant documents (ranked list 503) to the query 511 based on at least in part the second randomly-selected value 425. The second ranked list of relevant documents (the ranked list 503) comprises the target document 404 at a demoted-rank position—that is, the target document 404 occupies the sixth position in the ranked list 503 as opposed to its default position, the fourth position in the ranked list 501. Hence, it can be said that the second randomly-selected value 425 (in this example being assumed to be negative) demotes the target document 404 in the ranked list of relevant documents.

Developers of the present technology have realized that using randomly-selected values as described above for sequentially promoting the target document 404 during the first time interval 410 and demoting the target document 404 during the second time interval 420 can be beneficial for reducing the risk of fraud if the target document 404 originates from a potentially fraudulent web resource. It should be noted that the server 106 is configured to perform a plurality of searches during the first time interval 410 and during the second time interval 420, respectively. As a result, having the target document 404 being generally promoted in ranks during the first time interval 410 and being generally demoted in ranks during the second time interval 420 increases the gap of user traffic to the target document 404 (and therefore to the respective web resource) between the first time interval 410 and the second time interval 420.

Figure 6:
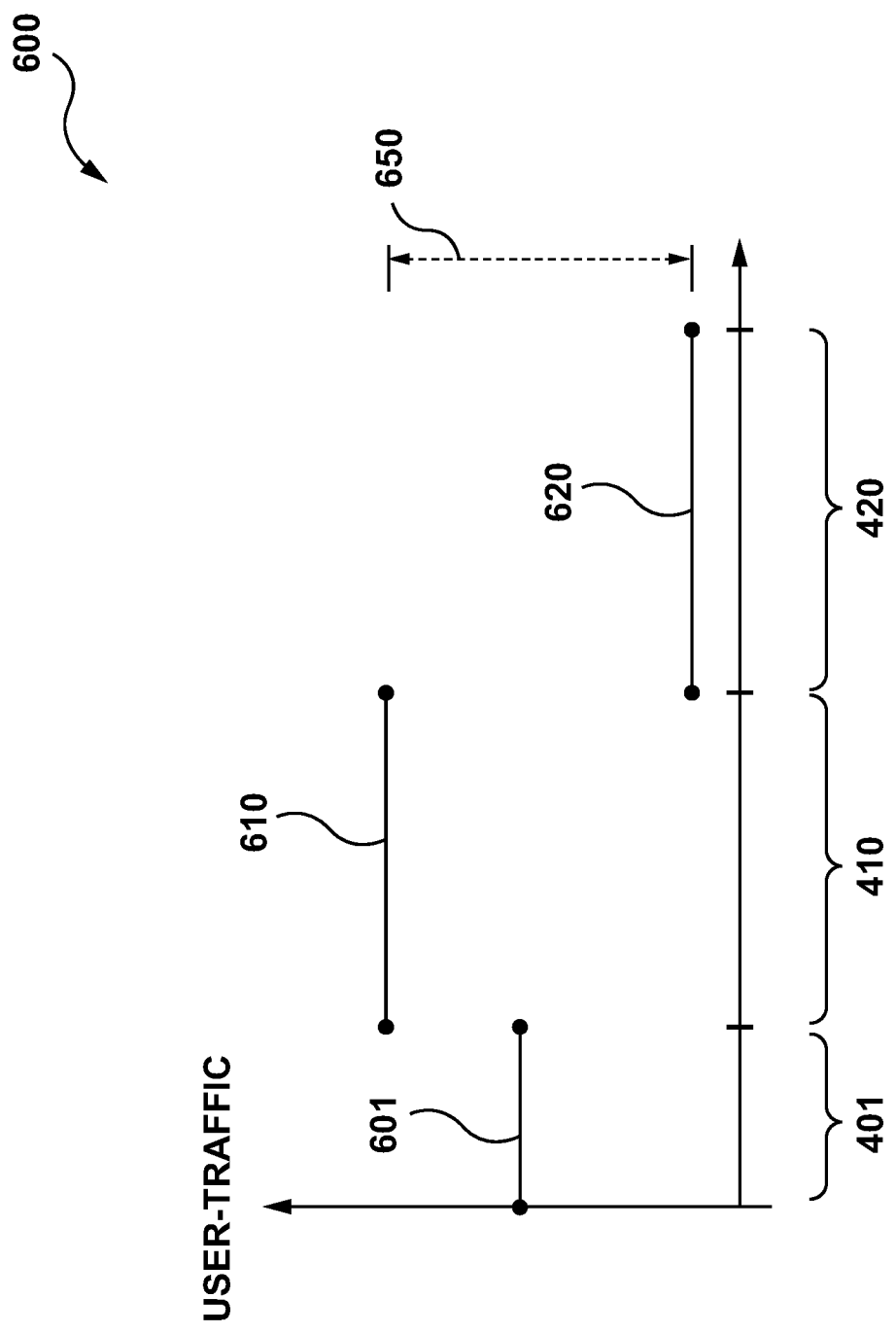
FIG. 6 depicts a representation of how user traffic to the target document of FIG. 4 varies depending on respective time intervals, in accordance with non-limiting embodiments of the present technology.

To better illustrate this, reference will now be made to FIG. 6 depicting a representation 600 of how user traffic to the target document 404 may vary depending on respective time intervals and respective randomly-selected values used for ranking the target document 404.

In particular, the representation 600 shows an indication of user traffic 601 during the interval of time 401, an indication of user traffic 610 during the first time interval 410, and an indication of user traffic 620 during the second time interval 420. As explained above, assuming that during the interval of time 401 the server 106 is not employing the randomization algorithm 140 for ranking purposes, the indication of user traffic 601 is an indication of user traffic to the target document 404 if the relevance of the target document 404 is not adjusted by a given randomly-selected value.

In the illustrated example, the indication of user traffic 610 is an indication of user traffic to the target document 404 if the relevance of the target document 404 is positively adjusted by the first randomly-selected value 415. Indeed, if the target document 404 is presented at a promoted-rank position during the first time interval 410, user traffic to the target document 404 generally tends to increase. Also, the indication of user traffic 620 is an indication of user traffic to the target document 404 if the relevance of the target document 404 is negatively adjusted by the second randomly-selected value 425. Indeed, if the target document 404 is presented at a demoted-rank position during the second time interval 420, user traffic to the target document 404 generally tends to decrease.

Hence, ranking the target document 404 at promoted-rank positions during the first time interval 410 and at demoted-rank positions during the second time interval 420, results in a gap 650 in user traffic to the target document 404 between the first time interval 410 and the second time interval 420.

Figure 7:
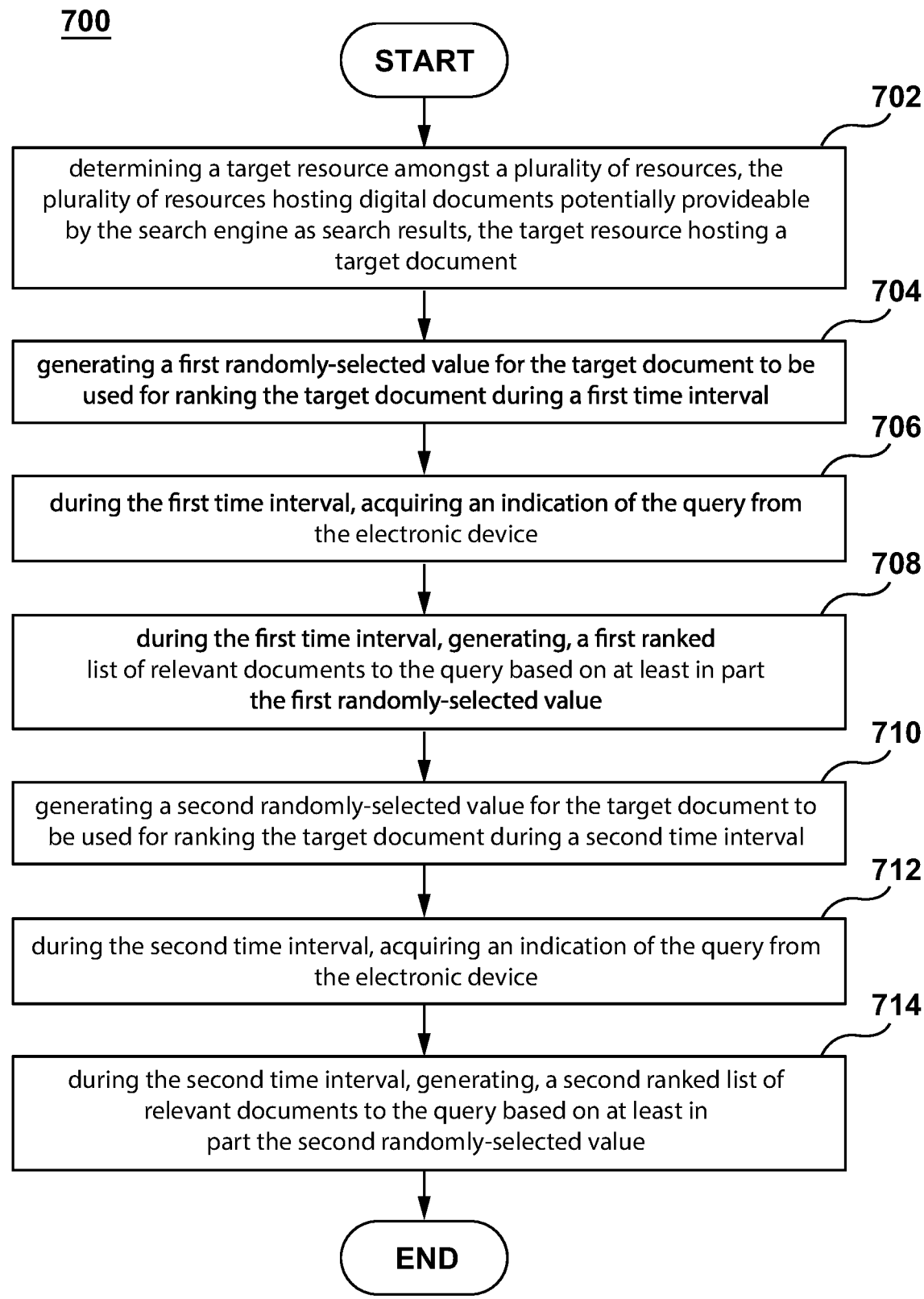
FIG. 7 is a schematic representation of method executable by a server of the system of FIG. 1, in accordance with non-limiting embodiments of the present technology.

With reference to FIG. 7, there is depicted a schematic representation of a method 700 of ranking digital documents in response to a query. For example, the server 112 may be configured to execute the method 700, the steps of which will now be discussed in greater details.

Step 702: Determining a Target Resource Amongst a Plurality of Resources, the Plurality of Resources Hosting Digital Documents Potentially Providable by the Search Engine as Search Results, the Target Resource Hosting a Target Document The method 700 begins at step 702 with the server 112 configured to determine a given target resource amongst a plurality of resources. For example, the server 112 may be configured to determine the target commercial resource 210 amongst the plurality of resources 202 hosting digital documents that are potentially providable by the search engine as search results. It should be noted that the target resource 210 hosts the target document 404.

In some embodiments, it should be noted that the server 112 may be configured to access the database sub-system 180 for retrieving past search data. The past search data comprises data indicative of past queries and respectively associated documents that have been provided as search results in response thereto. The server 112 may also be configured to determine the plurality of commercial resources 202 by determining which resources host digital documents that have been provided as search results to past commercial queries. It should be noted that a given past commercial query may be a given past query that has at least one pre-determined term.

The server 112 may also be configured to filter the plurality of commercial resources 202 by removing high-traffic resources, thereby determining a set of commercial resources. The server 112 may be configured to applying a given traffic-based threshold onto user traffic associated with the respective ones of the plurality of commercial resources for determining the set of commercial resources.

The server 112 may also be configured to filter the so-determined set of commercial resources by removing high-quality resources, thereby determining the subset of commercial resources 204. The server 112 may be configured to apply a given quality-based threshold onto data associated with the respective ones from the set of commercial resources. The subset of commercial resources 204 comprises the target resource 210.

It is contemplated that the server 112 may be configured to determine the group of commercial resources 206 that are likely not fraudulent commercial resources (e.g., high-quality and high-traffic commercial resources). In some embodiments, the server 112 may be configured to select the target resource 210 amongst the subset of commercial resources 204.

In other embodiments, the server 112 may be configured to determine the plurality of commercial resources 202 based on search data of the search engine and determine the subset of commercial resources 204 by filtering out the group of commercial resources 206 from the plurality of commercial resources 202. The group of commercial resources 206 has a high likelihood of not including fraudulent resources based on one or more pre-determined parameter.

In some embodiments, the server 112 may be configured to determine the group of commercial resources 206 by applying a pre-determined parameter onto the search data associated with the respective ones from the plurality of commercial resources 202, and where the pre-determined parameter is at least one of the traffic-based threshold 220 and the quality-based threshold 230. The high-traffic resources and the high-quality resources amongst the plurality of commercial resources 202 having a high likelihood of not being fraudulent resources.

Step 704: Generating a First Randomly-Selected Value for the Target Document to be Used for Ranking the Target Document During a First Time Interval The method 700 continues to step 704 with the server 112 configured to generate the first randomly-selected value 415 for the target document 404 to be used for ranking the target document during the first time interval 410.

In some embodiments, the server 112 may be configured to employ the randomization algorithm 140 for generating the first randomly-selected value 415. It should be noted that in some embodiments, the first randomly-selected value 415 may be a given positive value.

Step 706: During the First Time Interval, Acquiring an Indication of the Query from the Electronic Device The method 700 continues to step 706 with the server 112 configured to, during the first time interval 410, acquire an indication of the query 511 from a given electronic device (e.g., device 104).

Step 708: During the First Time Interval, Generating a First Ranked List of Relevant Documents to the Query Based on at Least in Part the First Randomly-Selected Value The method 700 continues to step 708 with the server 112 configured to, during the first time interval 410, generate a first ranked list 502 of relevant documents to the query 511 based on at least in part the first randomly-selected value 415. It should be noted that the first ranked list 502 of relevant documents comprises the target document 404 at a promoted-rank position. As illustrated in FIG. 5, the promoted-rank position is the second position. It should also be noted that the first randomly-selected value 415 promotes the target document 404 in the ranked list 502 of relevant documents, as previously explained, if compared to the position of the target document 404 in the ranked list 501.

It should be noted that the server may be configured to, during the first time interval execute a first plurality of searches (similarly to the search yielding the first ranked list 502) and where the target document 404 is provided as a search result for a subset of the first plurality of searches.

In some embodiments of the present technology, it should be noted that the first ranked list 502 may be generated by an MLA (ranking model 130) having been trained to rank documents based on respective estimated relevance to the query 511 and respective randomly-selected values. For example, more than one target document may be ranked in the first ranked list 502 based on respective estimated relevance to the query 511 and respective randomly-selected values.

In some embodiments, the server 112 may be configured to train the ranking model 130 for ranking documents. To that end, the server 112 may be configured to acquire training data 302 for a training document-query pair. The training data 302 comprises (i) query data 306 associated with a training query, (ii) document data 304 associated with a training document including the training randomly-selected value 308, and (iii) the assessed label 310 indicative of a relevance of the training document to the training query.

The server 112 may be configured to generate the modified label 320 as a combination of the assessed label 310 and the training randomly-selected value 308. For example, the server 106 may be configured to use the randomization algorithm 140 in order to generate the randomly-selected value 308 during training of the ranking model 130. Thus, it can be said that the server 112 may be configured to generate a training set comprising the query data 306, the document data 304 and the modified label 320.

It should be noted that during the training iteration, the server 112 is configured to input, into the MLA being trained, the query data 306 and the document data 304 for generating the predicted ranking score 330 for the training document. Broadly speaking, the predicted ranking score 330 is indicative of a predicted relevance of the training document to the training query. The server 112 may also configured to adjust the MLA based on a comparison of the predicted ranking score 330 against the modified label 310 so as to train the MLA to generate predicted ranking scores that are similar to modified labels.

In other embodiments of the present technology, the server 112 may be configured to train the ranking model 130 while using the assessed label 310 (as opposed to the modified label 320) for comparison against the predicted ranking score 330. In such embodiments, the server 112 may use the ranking model 130 during its in-use phase for predicting an in-use ranking score for the target document 404—query 511 pair, and then, adjust the so-determined in-use ranking score by the first randomly-selected value 415 during the first time interval 410. The target document 404 may be ranked in the first ranked list 502 based on the so-adjusted in-use ranking score.

Step 710: Generating a Second Randomly-Selected Value for the Target Document to be Used for Ranking the Target Document During a Second Time Interval The method 700 continues to step 710 with the server 112 configured to generate the second randomly-selected value 425 for the target document 404 to be used for ranking the target document 404 during the second time interval 420.

In some embodiments, the server 112 may be configured to employ the randomization algorithm 140 for generating the second randomly-selected value 425. It should be noted that in some embodiments, the second randomly-selected value 425 may be a given negative value.

In some embodiments, the first time interval 410 and the second time interval 420 have a common time length. In other embodiments, the first time interval 410 is before the second time interval 420. In further embodiments, the first time interval 410 is after the second time interval 420. In yet other embodiments, the first time interval 410 is one of a plurality of first time intervals and the second time interval 420 is one of a plurality of second time intervals. In such cases, the respective ones from the plurality of first time intervals and from the second plurality of time intervals may be sequentially staggered in time.

Step 712: During the Second Time Interval, Acquiring an Indication of the Query from the Electronic Device The method 700 continues to step 712 with the server 112 configured to, during the second time interval 420, acquire an indication of the query 511 from a given electronic device (e.g., device 104).

Step 714: During the Second Time Interval, Generating a Second Ranked List of Relevant Documents to the Query Based on at Least in Part the Second Randomly-Selected Value The method 700 continues to step 714 with the server 112 configured to generate a second ranked list 503 of relevant documents to the query 511 based on at least in part the second randomly-selected value 425. It should be noted that the second ranked list 503 of relevant documents comprises the target document 404 at a demoted-rank position. As illustrated in FIG. 5, the demoted-rank position is the sixth position. It should also be noted that the second randomly-selected value 425 demotes the target document 404 in the second ranked list 503 of relevant documents, as previously explained, if compared to the position of the target document 404 in the ranked list 501.

It should be noted that in some embodiments, the server 112 may be configured to execute the first plurality of searches during the first time interval 410 and a second plurality of searches during the second time interval 420 where at least some of the first plurality of searches and the second plurality of searches yields the target document 404 as a given search result.

It should be noted that the promoted-rank position in the first ranked list 502 is above the demoted-rank position in the second ranked list 503 for increasing the gap 650 in user traffic to the target document 404 between the first time interval 410 and the second time interval 420.

In some embodiments of the present technology, the server 112 may be configured to monitor the user traffic to the target document 404 during the first time interval 410 and during the second time interval 420.

In those embodiments where the server 112 is configured to train the ranking model 130 while using the assessed label 310 (as opposed to the modified label 320) for comparison against the predicted ranking score 330, the server 112 may use the ranking model 130 during its in-use phase for predicting an in-use ranking score for the target document 404—query 511 pair, and then, adjust the so-determined in-use ranking score by the second randomly-selected value 425 during the first time interval 420. The target document 404 may be ranked in the second ranked list 503 based on the so-adjusted in-use ranking score.

Developers of the present technology have devised methods and systems for artificially increasing a gap or variation in user traffic to a given commercial web resource between different time intervals. As a result, the operator of the given commercial web resource (e.g., the target resource 210 hosting the target document 404) may realize that, between the first time interval 410 and the second time interval 410, user traffic to the given commercial web resource dropped. If the operator is involved in a fraudulent scheme, the operator may consider stopping their fraudulent activity since the now reduced user traffic may not generate enough benefits for continuing the fraudulent scheme.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of ranking documents in response to a query, the query being submitted by a user of an electronic device to a search engine, the search engine being hosted by a server, the method executable by the server, the method comprising:
   determining, by the server, a target resource amongst a plurality of resources, the plurality of resources hosting digital documents, the target resource hosting a target document;
   generating, by the server, a first randomly-selected value for the target document;
   generating, by the server, a second randomly-selected value for the target document;
   storing the first randomly-selected value in association with a first time interval;
   storing the second randomly-selected value in association with a second time interval;
   acquiring, by the server, an indication of the query from the electronic device;
   determining whether the query was received during the first time interval or the second time interval;
   generating, by the server, a ranked list of relevant documents to the query;
   after determining that the query was received during the first time interval:
      adjusting, based on the first randomly-selected value, a ranking of the target document in the ranked list of relevant documents so that the target document appears at a promoted-rank position; and
   after determining that the query was received during the second time interval:
      adjusting, based on the second randomly-selected value, the ranking of the target document in the ranked list of relevant documents so that the target document appears at a demoted-rank position,
   the promoted-rank position being above the demoted-rank position in the ranked list.

2. The method of claim 1, wherein the generating the first randomly-selected value and the second randomly-selected value comprises employing, by the server, a randomization algorithm.

3. The method of claim 2, wherein the randomization algorithm generates (i) a positive value when employed for the generating the first randomly-selected value, and (ii) a negative value when employed for the generating the second randomly-selected value.

4. The method of claim 1, wherein the method further comprises:
   during the first time interval, executing, by the server hosting the search engine, a first plurality of searches; and
   during the second time interval, executing, by the server hosting the search engine, a second plurality of searches; and
   the target document being provided as a search result for a subset of the first plurality of searches and for a subset of the second plurality of searches.

5. The method of claim 1, wherein the method further comprises:
   monitoring, by the server, the user traffic to the target document during the first time interval and during the second time interval.

6. The method of claim 1, wherein the generating the ranked list is performed by a Machine Learning Algorithm (MLA) having been trained to rank documents based on respective estimated relevance to the query.

7. The method of claim 6, wherein the method further comprises training, by the server, the MLA to rank documents, the training comprising:
   acquiring, by the server, training data for a training document-query pair, the training data comprising (i) query data associated with a training query, (ii) document data associated with a training document including a training randomly-selected value and (iii) an assessed label indicative of a relevance of the training document to the training query;
   during a given training iteration:
      inputting, by the server into the MLA, the query data and the document data for generating a predicted ranking score for the training document, the predicted ranking score being indicative of a predicted relevance of the training document to the training query;

adjusting, by the server, the MLA based on a comparison of the predicted ranking score against the assessed label so as to train the MLA to generate predicted ranking scores that are similar to the assessed label.

8. The method of claim 1, wherein the determining the target resource comprises:
accessing, by the server, a database system for retrieving past search data, the past search data comprising data indicative of past queries and respectively associated documents that have been provided as search results in response thereto;
determining, by the server, a plurality of commercial resources by determining which resources host digital documents that have been provided as search results to past commercial queries,
a given past commercial query being a given past query having at least one pre-determined term;
filtering, by the server, the plurality of commercial resources by removing high-traffic resources, thereby determining a set of commercial resources, the filtering comprising:
applying, by the server, a traffic-based threshold onto user traffic associated with the respective ones of the plurality of commercial resources;
filtering, by the server, the set of commercial resources by removing high-quality resources, thereby determining a subset of commercial resources, the filtering comprising:
applying, by the server, a quality-based threshold onto data associated with the respective ones from the set of commercial resources,
the subset of commercial resources comprising the target resource.

9. The method of claim 1, wherein the method further comprises:
selecting, by the server, the target resource amongst a subset of commercial resources, the target resource being a given commercial resource.

10. The method of claim 9, wherein the method further comprises:
determining, by the server, a plurality of commercial resources based on search data of the search engine; and
determining, by the server, the subset of commercial resources by filtering out a group of commercial resources from the plurality of commercial resources, the group of commercial resources having a high likelihood of not including fraudulent resources based on one or more pre-determined parameter.

11. The method of claim 10, wherein the method further comprises:
determining, by the server, the group of commercial resources by applying a pre-determined parameter onto the search data associated with the respective ones from the plurality of commercial resources, the pre-determined parameter being at least one of a traffic-based threshold and a quality-based threshold,
high-traffic resources and high-quality resources amongst the plurality of commercial resources having a high likelihood of not being fraudulent resources.

12. The method of claim 1, wherein the first time interval and the second time interval have a common time length.

13. The method of claim 1, wherein the first time interval is before the second time interval.

14. The method of claim 1, wherein the first time interval is after the second time interval.

15. The method of claim 1, wherein the first time interval is one of a plurality of first time intervals and the second time interval is one of a plurality of second time intervals, the respective ones from the plurality of first time intervals and from the second plurality of time intervals are sequentially staggered in time.

16. A server for ranking documents in response to a query, the query being submitted by a user of an electronic device to a search engine, the search engine being hosted by the server, the server being configured to:
determine a target resource amongst a plurality of resources, the plurality of resources hosting digital documents, the target resource hosting a target document;
generate a first randomly-selected value for the target document;
generate a second randomly-selected value for the target document;
store the first randomly-selected value in association with a first time interval;
store the second randomly-selected value in association with a second time interval;
acquire an indication of the query from the electronic device;
determine whether the query was received during the first time interval or the second time interval;
generate a ranked list of relevant documents to the query;
after determining that the query was received during the first time interval:
adjust, based on the first randomly-selected value, a ranking of the target document in the ranked list of relevant documents so that the target document appears at a promoted-rank position; and
after determining that the query was received during the second time interval:
adjust, based on the second randomly-selected value, the ranking of the target document in the ranked list of relevant documents so that the target document appears at a demoted-rank position,
the promoted-rank position being above the demoted-rank position in the ranked list.

17. The server of claim 16, wherein the server configured to generate the first randomly-selected value and the second randomly-selected value comprises the server configured to employ a randomization algorithm.

18. The server of claim 17, wherein the randomization algorithm generates (i) a positive value when employed for the generating the first randomly-selected value, and (ii) a negative value when employed for the generating the second randomly-selected value.

19. The server of claim 16, wherein the server is further configured to:
during the first time interval, execute, by the search engine, a first plurality of searches; and
during the second time interval, execute, by the search engine, a second plurality of searches; and
the target document being provided as a search result for a subset of the first plurality of searches and for a subset of the second plurality of searches.

20. The server of claim 16, wherein the server is further configured to:
monitor the user traffic to the target document during the first time interval and during the second time interval.

21. The server of claim 16, wherein the server employs a Machine Learning Algorithm (MLA) to generate the ranked list, the MLA having been trained to rank documents based on respective estimated relevance to the query.

22. The server of claim 16, wherein the server configured to determine the target resource comprises the server configured to:
access a database system for retrieving past search data, the past search data comprising data indicative of past queries and respectively associated documents that have been provided as search results in response thereto;
determine a plurality of commercial resources by determining which resources host digital documents that have been provided as search results to past commercial queries,
a given past commercial query being a given past query having at least one pre-determined term;
filter the plurality of commercial resources by removing high-traffic resources, thereby determining a set of commercial resources, the server configured to filter comprising the server configured to:
apply a traffic-based threshold onto user traffic associated with the respective ones of the plurality of commercial resources;
filter the set of commercial resources by removing high-quality resources, thereby determining a subset of commercial resources, the server configured to filter comprising the server configured to:
apply a quality-based threshold onto data associated with the respective ones from the set of commercial resources,
the subset of commercial resources comprising the target resource.

23. The server of claim 16, wherein the server is further configured to:
select the target resource amongst a subset of commercial resources, the target resource being a given commercial resource.

24. The server of claim 23, wherein the server is further configured to:
determine a plurality of commercial resources based on search data of the search engine; and
determine the subset of commercial resources by filtering out a group of commercial resources from the plurality of commercial resources, the group of commercial resources having a high likelihood of not including fraudulent resources based on one or more pre-determined parameter.

25. The server of claim 24, wherein the server is further configured to:
determine the group of commercial resources by applying a pre-determined parameter onto the search data associated with the respective ones from the plurality of commercial resources, the pre-determined parameter being at least one of a traffic-based threshold and a quality-based threshold,
high-traffic resources and high-quality resources amongst the plurality of commercial resources having a high likelihood of not being fraudulent resources.

26. The server of claim 16, wherein the first time interval and the second time interval have a common time length.

27. The server of claim 16, wherein the first time interval is before the second time interval.

28. The server of claim 16, wherein the first time interval is after the second time interval.

29. The server of claim 16, wherein the first time interval is one of a plurality of first time intervals and the second time interval is one of a plurality of second time intervals, the respective ones from the plurality of first time intervals and from the second plurality of time intervals are sequentially staggered in time.

30. A non-transitory computer-readable storage medium, storing a computer program, wherein the computer program, when executed by a processor of a first electronic device, causes the first electronic device to perform:
determining a target resource amongst a plurality of resources, the plurality of resources hosting digital documents, the target resource hosting a target document;
generating a first randomly-selected value for the target document;
generating a second randomly-selected value for the target document;
storing the first randomly-selected value in association with a first time interval;
storing the second randomly-selected value in association with a second time interval;
acquiring an indication of a query from a second electronic device, the query being submitted by a user of the second electronic device to a search engine;
determining whether the query was received during the first time interval or the second time interval;
generating a ranked list of relevant documents to the query;
after determining that the query was received during the first time interval:
adjusting, based on the first randomly-selected value, a ranking of the target document in the ranked list of relevant documents so that the target document appears at a promoted-rank position; and
after determining that the query was received during the second time interval:
adjusting, based on the second randomly-selected value, the ranking of the target document in the ranked list of relevant documents so that the target document appears at a demoted-rank position,
the promoted-rank position being above the demoted-rank position in the ranked list.

* * * * *